United States Patent
Wang (10) Patent No.: US 9,785,026 B2
(45) Date of Patent: Oct. 10, 2017

(54) LIQUID CRYSTAL DISPLAY DEVICE, LIQUID CRYSTAL DISPLAY AND METHOD FOR DARKENING PROCESS OF THE SAME

(71) Applicant: Shenzhen China Star Optoelectronics Technology Co., Ltd., Shenzhen, Guangdong (CN)

(72) Inventor: Zui Wang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 183 days.

(21) Appl. No.: 14/439,216

(22) PCT Filed: Apr. 2, 2015

(86) PCT No.: PCT/CN2015/075764
§ 371 (c)(1),
(2) Date: Apr. 28, 2015

(87) PCT Pub. No.: WO2016/149957
PCT Pub. Date: Sep. 29, 2016

(65) Prior Publication Data
US 2017/0045790 A1    Feb. 16, 2017

(30) Foreign Application Priority Data
Mar. 25, 2015   (CN) .......................... 2015 1 0133677

(51) Int. Cl.
*G02F 1/1362* (2006.01)
*G02F 1/1333* (2006.01)
(Continued)

(52) U.S. Cl.
CPC ...... *G02F 1/136286* (2013.01); *G02F 1/1333* (2013.01); *G02F 1/1362* (2013.01);
(Continued)

(58) Field of Classification Search
CPC ............. G02F 1/136286; G02F 1/1368; G02F 1/133345; G02F 2001/136295
See application file for complete search history.

(56) References Cited

U.S. PATENT DOCUMENTS 9,019,464 B2 *   4/2015   Yoon ..................... G02F 1/1309
                                                        349/192
9,329,440 B2     5/2016   Lee et al.
(Continued)

FOREIGN PATENT DOCUMENTS

CN       102629043 A     8/2012
CN       102629605 A     8/2012
(Continued)

*Primary Examiner* — Michael Caley
*Assistant Examiner* — Mariam Qureshi
(74) *Attorney, Agent, or Firm* — Andrew C. Cheng (57) ABSTRACT

The present invention provides a liquid crystal display device, a liquid crystal display, a manufacturing method and a darkening process. The liquid crystal display includes a lower substrate provided with a lower common electrode, a scanning line, a data line, a pixel electrode and a TFT. A gate electrode of the TFT is connected with the scanning line. A source electrode of the TFT is connected with a data line. A drain electrode of the TFT is connected with the pixel electrode. Wherein, the lower common electrode has an extension portion. A connection line of the data line and the source electrode of the TFT is spaced apart from and overlapped with the extension portion. When executing a darkening process, the connection line is disconnected from the data line, and connecting the extension portion and the connection line.

17 Claims, 5 Drawing Sheets

(51) Int. Cl.
  *G02F 1/1368* (2006.01)
  *G02F 1/1343* (2006.01)

(52) U.S. Cl.
  CPC ........ *G02F 1/1368* (2013.01); *G02F 1/13439* (2013.01); *G02F 1/133345* (2013.01); *G02F 1/136213* (2013.01); *G02F 1/136259* (2013.01); *G02F 2001/13629* (2013.01); *G02F 2001/136263* (2013.01); *G02F 2001/136295* (2013.01); *G02F 2201/121* (2013.01); *G02F 2201/123* (2013.01); *G02F 2201/508* (2013.01)

(56) References Cited

U.S. PATENT DOCUMENTS

| | | | |
|---|---|---|---|
| 9,557,614 B2 | 1/2017 | Cheng et al. | |
| 2002/0163602 A1* | 11/2002 | Lee | G02F 1/136259 349/43 |
| 2004/0229387 A1 | 11/2004 | Jinno | |
| 2015/0009463 A1* | 1/2015 | Cha | G02F 1/136259 349/138 |
| 2016/0291368 A1* | 10/2016 | Kim | H01L 27/124 |
| 2016/0299392 A1* | 10/2016 | Cheng | G02F 1/1362 |

FOREIGN PATENT DOCUMENTS

| | | |
|---|---|---|
| CN | 104201151 A | 12/2014 |
| KR | 1020060034382 A | 4/2006 |

* cited by examiner

LIQUID CRYSTAL DISPLAY DEVICE, LIQUID CRYSTAL DISPLAY AND METHOD FOR DARKENING PROCESS OF THE SAME

BACKGROUND OF THE INVENTION

1. Field of the Invention

The present invention relates to a display technology field, and more particularly to a liquid crystal display device, a liquid crystal display, a manufacturing method for a liquid crystal display, and a method for a darkening process of the same.

2. Description of Related Art

Figure 1A:
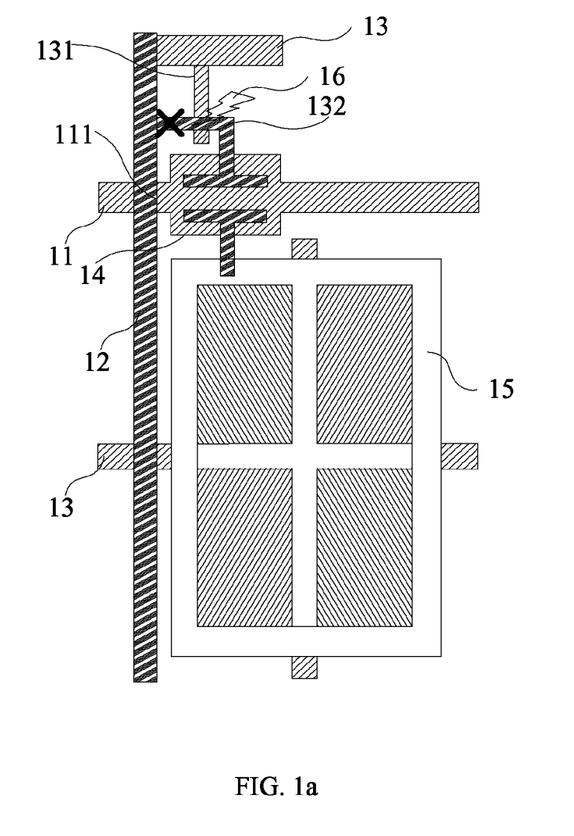
FIG. 1a is a top view of a pixel structure of a VA-type liquid crystal display panel according to the prior art.

FIG. 1a is a top view of a pixel structure of a VA-type liquid crystal display panel. As shown in FIG. 1a, a pixel structure usually includes a scanning line (Gate) 1, a data line (Data) 2, a common electrode (Com), a thin-film-transistor (TFT) 4 and a pixel electrode 5. Wherein, the TFT 4 functions as a switch in the driving of the pixel. When the TFT 4 is turned on, a data signal can be written into the pixel electrode 5, and at the other time, the TFT 4 is turned off. In an actual production, because of metal residues or abnormal object, a channel of the TFT 4 may be short so as to lose the switching function, which results in bright point at the pixel. At this time, a darkening process for the pixel having the bright point is required.

Figure 1B:
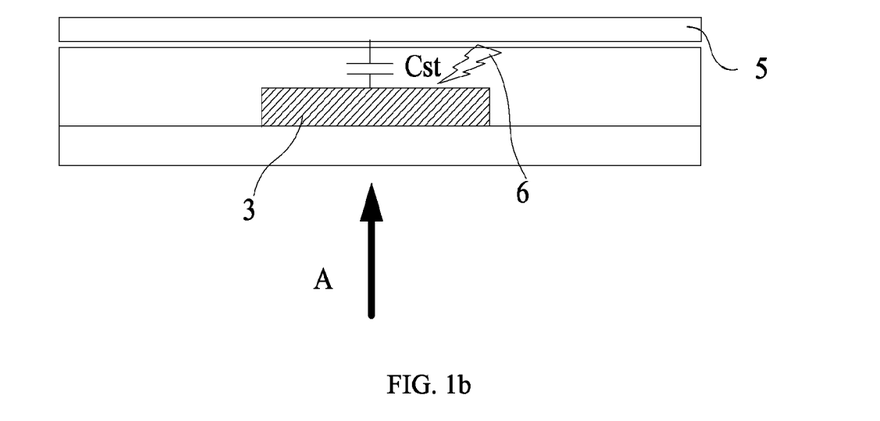
FIG. 1b is a partial equivalent circuit diagram of a VA-type liquid crystal display panel.
Figure 1C:
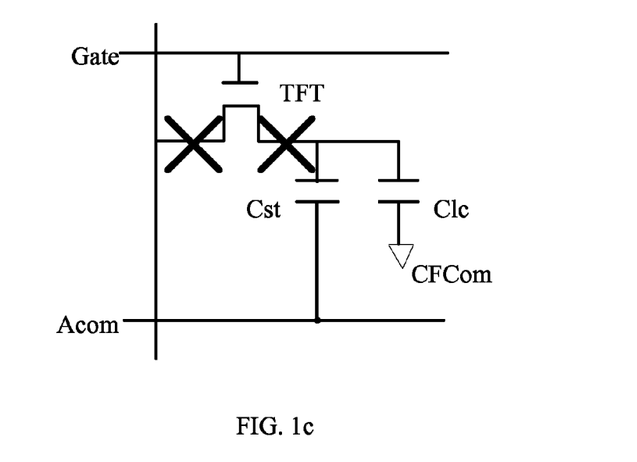
FIG. 1c is a main view of a partial structure of a VA-type liquid crystal display panel.

As shown in FIG. 1a to FIG. 1c, firstly, disconnecting and breaking (the "X" shown in FIG. 1a to FIG. 1c represents disconnecting and breaking) the TFT 4 from the data line and the pixel electrode. Then, using a laser along "A" direction to irradiate an overlapping position of the pixel electrode and the common electrode (Acom) of a lower substrate. Under a high heat, the pixel electrode and the common electrode are melted together to realize conduction (In FIG. 1b, numeral "6" represent using the laser to achieve conduction). Accordingly, the pixel will be display as a dark point. However, when utilizing a technology such as COA (Color Filter On Array) or an organic flat layer, between the pixel electrode and the common electrode of the lower substrate, a very thick insulation layer is added, if the conventional darkening method is used, the laser power must be added in order to overcome the additional insulation layer such that repair difficulty is increased. When the laser power is increased, the temperature is also increased, the color resist and the pixel electrode is easily to explode and flip in the higher temperature such that appearance of the pixel electrode is changed so as to cause the abnormal situation of the alignment of the liquid crystal molecules. At the same time, the splash fragments are easily to generate a fragmental bright point problem so that the darkening process is failed.

SUMMARY OF THE INVENTION

The main technology problem solved by the present invention is to provide a liquid crystal display device, a liquid crystal display, a manufacturing method, and darkening process in order to solve the problems of easily to explode and flip at color resist layer and ITO layer when executing a darkening process, and easily to generate a fragmental bright point.

In order to solve the above problems, a technology solution adopted by the present invention is: a liquid crystal display device including a liquid crystal display, wherein the liquid crystal display comprises: an upper substrate, provided with an upper common electrode; a lower substrate, disposed oppositely to the upper substrate and provided with a lower common electrode having an extension portion, wherein, the lower substrate also provides with a scanning line, a data line, a pixel electrode and a thin-film-transistor (TFT); a gate electrode of the TFT is connected with the scanning line; a source electrode of the TFT is connected with a data line; a drain electrode of the TFT is connected with the pixel electrode; the pixel electrode is disposed at one side of an isolation and intersection location of the data line and the scanning line; the extension portion is disposed at the other side of an isolation and intersection location of the data line and the scanning line; and a liquid crystal layer, disposed between the upper substrate and the lower substrate; wherein, a connection line of the data line and the source electrode of the TFT is spaced apart from and overlapped with the extension portion; when executing a darkening process, disconnecting the connection line from the data line and conducting the extension portion with the connection line.

Wherein, the extension portion is isolated, spaced apart from and overlapped with the connection line, and the extension portion is located above or below the connection line.

Wherein, the lower substrate also provides with an insulation layer which makes the scanning line, the data line, the pixel electrode and the TFT to be insulated with each other.

Wherein, the lower substrate is formed by a color filter on array (COA) technology or an organic flat layer technology.

Wherein, a color resist layer or a flat layer is disposed between the pixel electrode and the insulation layer.

Wherein, a storage capacitor is formed between the pixel electrode and the upper common electrode.

Wherein, a liquid crystal capacitor is formed between the pixel electrode and the lower common electrode.

In order to solve the above problems, a technology solution adopted by the present invention is: a liquid crystal display, comprising: an upper substrate, provided with an upper common electrode; a lower substrate, disposed oppositely to the upper substrate and provided with a lower common electrode having an extension portion, wherein, the lower substrate also provides with a scanning line, a data line, a pixel electrode and a thin-film-transistor (TFT); a gate electrode of the TFT is connected with the scanning line; a source electrode of the TFT is connected with a data line; a drain electrode of the TFT is connected with the pixel electrode; and a liquid crystal layer, disposed between the upper substrate and the lower substrate; wherein, a connection line of the data line and the source electrode of the TFT is spaced apart from and overlapped with the extension portion; when executing a darkening process, disconnecting the connection line from the data line and conducting the extension portion with the connection line.

In order to solve the above problems, a technology solution adopted by the present invention is: a manufacturing method of a liquid crystal display, comprising: forming multiple parallel and spaced lower common electrodes on a lower substrate, wherein, each of the common electrodes has an extension portion; forming multiple parallel and spaced data lines on the lower substrate; forming multiple parallel and spaced scanning lines on the lower substrate, wherein, the scanning lines and the data lines are isolated and intersected to form multiple rectangles as a matrix; and forming a thin-film-transistor (TFT) at a corner of the rectangle; wherein, a gate electrode of the TFT is connected with the scanning line; a source electrode of the TFT is connected with a data line; a drain electrode of the TFT is connected with a pixel electrode; a connection line of the data line and the source electrode of the TFT is spaced apart from and overlapped with the extension portion; and forming the pixel electrode at one side of an isolation and intersection location of the data line and the scanning line.

Wherein, before the step of forming the pixel electrode at one side of an isolation and intersection location of the data line and the scanning line, further including a step of disposing an insulation layer on the lower substrate to make the scanning line, the data line, the pixel electrode and the TFT to be insulated with each other.

Wherein, after the step of disposing an insulation layer on the lower substrate to make the scanning line, the data line, the pixel electrode and the TFT to be insulated with each other, further including a step of utilizing a color filter on array (COA) technology or an organic flat layer technology to respectively form a color resist layer or a flat layer between the pixel electrode and the insulation layer.

In order to solve the above problems, a technology solution adopted by the present invention is: a darkening process method for a liquid crystal display, wherein, the liquid crystal display comprising: an upper substrate, provided with an upper common electrode; a lower substrate, disposed oppositely to the upper substrate and provided with a lower common electrode having an extension portion, wherein, the lower substrate also provides with a scanning line, a data line, a pixel electrode and a thin-film-transistor (TFT); a gate electrode of the TFT is connected with the scanning line; a source electrode of the TFT is connected with a data line; a drain electrode of the TFT is connected with the pixel electrode; and a liquid crystal layer, disposed between the upper substrate and the lower substrate; wherein, a connection line of the data line and the source electrode of the TFT is spaced apart from and overlapped with the extension portion; wherein, the pixel electrode is disposed at one side of an isolation and intersection location of the data line and the scanning line; the extension portion is disposed at the other side of the isolation and intersection location of the data line and the scanning line; and wherein, the method comprises: disconnecting the connection line from the data line; and conducting the extension portion with the source electrode of the TFT.

The beneficial effects of the present invention are: comparing to the prior art, the lower common electrode has an extension portion, and extension portion is spaced apart from and overlapped with a connection line of the data line and the source electrode of the TFT. When executing a darkening process, the connection line of the data line and the source electrode of the TFT are broken or disconnected, and connecting the extension portion with the connection line by a laser such that a voltage of the pixel electrode and a voltage of the lower common electrode are equal and further equal to a voltage of the upper common electrode. Accordingly, liquid crystal molecules corresponding to the pixel electrode do not generate a tilting to conduct light in order to finish the darkening process. The present invention can operate easily, decrease the difficulty for the darkening process, avoid a fragmental bright point problem because of the darkening process, and improve product repair rate and yield rate.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the person of ordinary skill in the art without creative effort, it can also obtain other figures according to these figures.

DETAILED DESCRIPTION OF THE PREFERRED EMBODIMENT

The following content combines figures and embodiments for detail description of the present invention.

Figure 2:
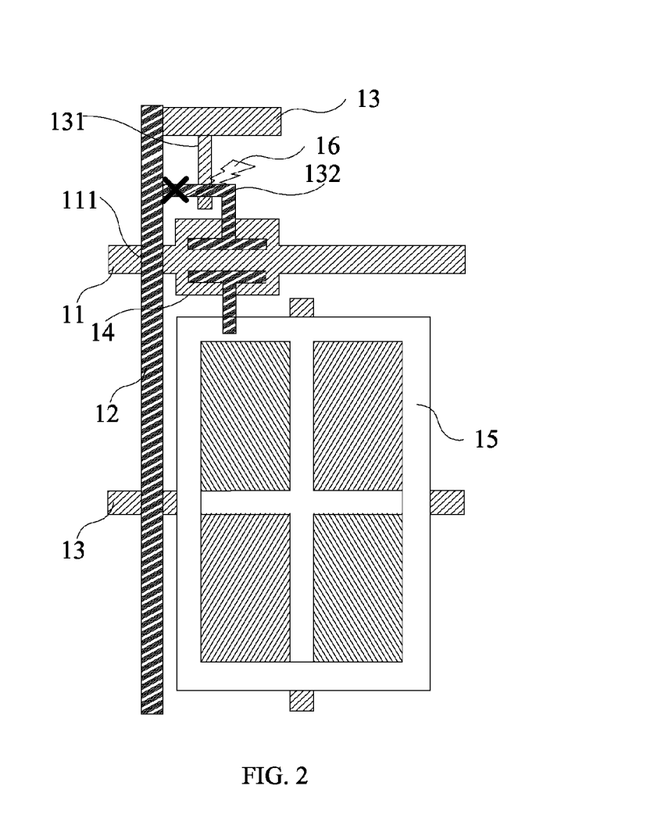
FIG. 2 is a top view of a pixel structure of a liquid crystal display according to the present invention.
Figure 3:
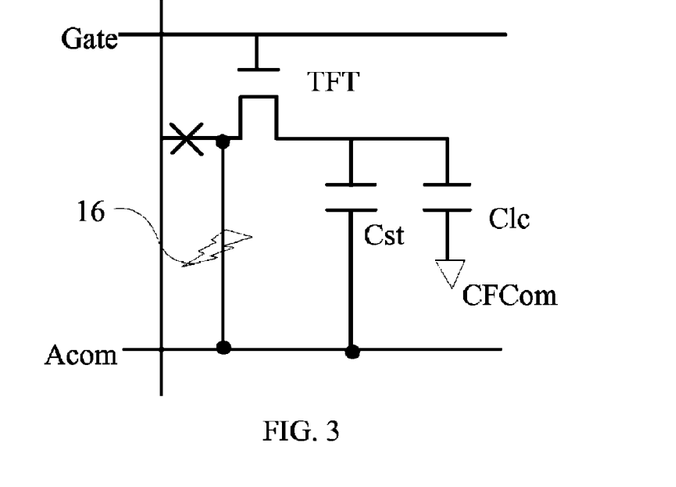
FIG. 3 is an equivalent circuit diagram of a pixel structure of a liquid crystal display according to the present invention.
Figure 4:
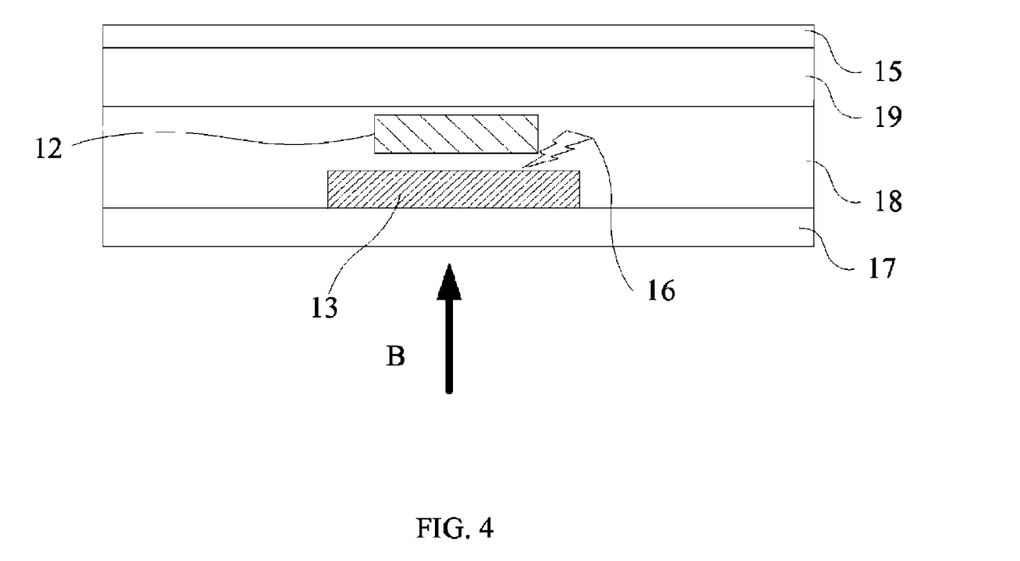
FIG. 4 is a main view of a liquid crystal display according to the present invention.

With reference to FIG. 2 to FIG. 4, wherein, FIG. 2 is a top view of a pixel structure of a liquid crystal display according to the present invention, FIG. 3 is an equivalent circuit diagram of a pixel structure of a liquid crystal display according to the present invention, and FIG. 4 is a main view of a liquid crystal display according to the present invention.

The liquid crystal display includes an upper substrate (not shown in the figures), a lower substrate, and a liquid crystal layer (not shown in the figures). The upper substrate is provided with an upper common electrode (not shown in the figures). The lower substrate is disposed oppositely to the upper substrate and having a lower common electrode 13. The liquid crystal layer is disposed between the upper substrate and the lower substrate 13.

The lower substrate of the present invention further provides with a scanning line 11, a data line 12, a pixel electrode 15 and a thin-film-transistor (TFT) 14. A gate electrode of the TFT 14 is connected with the scanning line 11. A source electrode of the TFT 14 is connected with the data line 12. A drain electrode of the TFT 14 is connected with the pixel electrode 15. Wherein, the lower common electrode 13 has an extension portion 131. A connection line 132 of the data line 12 and the drain electrode of the TFT 14 is spaced apart from and overlapped with the extension portion 131. The extension portion 131 is isolated, spaced apart from and overlapped with the connection line 132 at an upper portion or a lower portion of the connection line 132. Specifically, the extension portion 131 is extended from the lower common electrode 13 to the drain electrode of the TFT 14, and an end of the extension portion 131 is adjacent to the drain electrode of the TFT 14. Besides, the extension portion 131 is disposed at an upper portion or a lower portion of the connection line 132 of the data line 12 and the drain electrode of the TFT 14. Furthermore, the connection line 132 and the extension portion 131 are isolated.

The pixel electrode 15 and the upper common electrode form a storage capacitor Cst. The pixel electrode 15 and the lower common electrode 13 form a liquid crystal capacitor Clc. The pixel electrode 15 is disposed at one side of an isolation and intersection location 111 of the data line 12 and the scanning line 11. The extension portion 131 is disposed at the other side of the isolation and intersection location 111 of the data line 12 and the scanning line 11. Specifically, the isolation and intersection location 111 make the extension portion 131 and the pixel electrode 15 to be spaced apart. An isolation and intersection location of the extension portion 131 and the connection line 132 is not overlapped with and spaced apart from the pixel electrode 15 such that when executing a darkening process, the affection of laser to the pixel electrode 15 is decreased.

In another embodiment, the lower substrate further provides with an insulation layer 18 and a color resist layer 19 which are overlapped and disposed sequentially. The scanning line 11, the data line 12, the pixel electrode 15 and the TFT 14 are disposed in the insulation layer 18 so as to be insulated with each other. In another embodiment, the color resist layer 19 may not be provided between the pixel electrode 15 and the insulation layer 18. Instead, a flat layer may be provided. The color resist layer 19 can be formed on the lower substrate by a COA technology. The flat layer can be formed on the lower substrate by an organic flat layer technology.

As shown in FIG. 2 and FIG. 3, when executing a darkening process, a connection line 132 of the data line 12 and the source electrode of the TFT 14 are broken or disconnected (the "X" in FIG. 2 and FIG. 3 represent that the portion is broken or disconnected when executing a darkening process), and connecting the extension portion 131 with the connection line 132 (the numeral "16" in FIG. 2 and FIG. 4 represents that using a laser to connect two lines which are isolated originally) such that a voltage of the pixel electrode 15 and a voltage of the lower common electrode 13 are equal and further equal to a voltage of the upper common electrode. Accordingly, liquid crystal molecules corresponding to the pixel electrode 15 do not generate a tilting to conduct light in order to finish the darkening process.

The present invention also provides a liquid crystal display device, and the liquid crystal display device includes the liquid crystal display described above.

Figure 5:
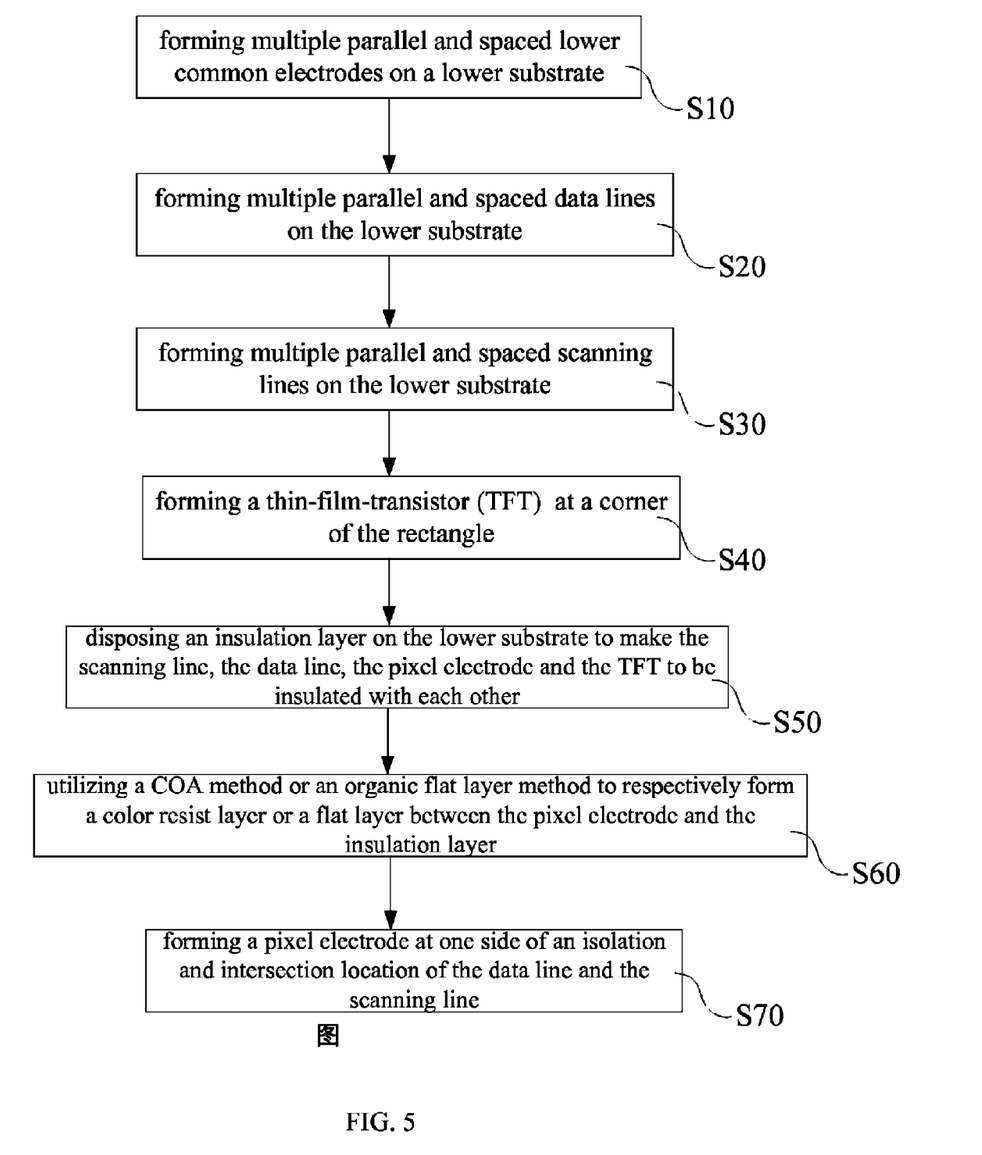
FIG. 5 is a flow chart of a manufacturing method of a liquid crystal display according to the present invention.

With reference to FIG. 5, FIG. 5 is a flow chart of a manufacturing method of a liquid crystal display device according to the present invention. The manufacturing method of the liquid crystal display of the present invention includes the following steps:

S10: forming multiple parallel and spaced lower common electrodes 13 on a lower substrate;

Wherein, each of the common electrodes 13 has an extension portion 131.

S20: forming multiple parallel and spaced data lines 12 on the lower substrate;

S30: forming multiple parallel and spaced scanning lines 11 on the lower substrate;

Wherein, the scanning lines 11 and the data lines 12 are isolated and intersected to form multiple rectangles as a matrix;

S40: forming a thin-film-transistor (TFT) 14 at a corner of the rectangle;

Wherein, a gate electrode of the TFT 14 is connected with the scanning line 11. A source electrode of the TFT 14 is connected with the data line 12. A drain electrode of the TFT 14 is connected with a pixel electrode 15. An extension portion 131 and a connection line 132 of the data line 12 and the source electrode of the TFT 14 are spaced apart and overlapped. That is, the connection line 132 and the extension portion 131 are overlapped and isolated. Specifically, the extension portion 131 is extended from the lower electrode 13 to the source electrode of the TFT 14. An end of the extension portion 131 is adjacent to the source electrode of the TFT 14. Besides, the extension portion 131 is disposed above or below the connection line 132 of the source electrode of the TFT 14.

S50: disposing an insulation layer 18 on the lower substrate to make the scanning line 11, the data line 12, the pixel electrode 15 and the TFT 14 to be insulated with each other;

S60: utilizing a COA method or an organic flat layer method to respectively form a color resist layer 19 or a flat layer between the pixel electrode 15 and the insulation layer 18;

Specifically, utilizing the COA method to form the color resist layer 19 between the pixel electrode 15 and the insulation layer 18, and utilizing the organic flat layer method to form the flat layer between the pixel electrode 15 and the insulation layer 18;

S70: forming a pixel electrode 15 at one side of an isolation and intersection location of the data line 12 and the scanning line 11;

Wherein, the pixel electrode 15 is disposed at one side of the isolation and intersection location 111 of the data line 12 and the scanning line 11. The extension portion 131 is disposed at the other side of the isolation and intersection location 111 of the data line 12 and the scanning line 11. Specifically, a spaced and overlapped location of the extension portion 131 and the connection line 132 are not overlapped with and are spaced apart from the pixel electrode 15 such that when executing a darkening process, the affection of a laser to the pixel electrode 15 is decreased.

Figure 6:
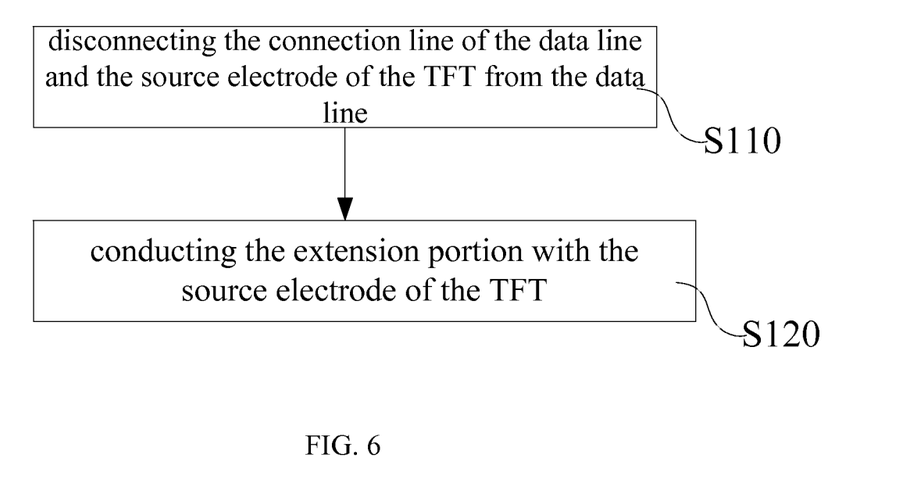
FIG. 6 is a flow chart of a darkening process of a liquid crystal display according to the present invention.

With reference to FIG. 6, FIG. 6 is a flow chart of a method of a darkening process of a liquid crystal display according to the present invention. The method comprises the following steps:

S110: disconnecting the connection line 132 of the data line 12 and the source electrode of the TFT 14 from the data line 12;

S120: conducting the extension portion 131 with the source electrode of the TFT 14.

Wherein, using a laser to irradiate an overlapped location of the extension portion 131 and the connection line 132 in order to conduct the extension portion 131 with the source electrode of the TFT 14.

In the present invention, the lower common electrode 13 has an extension portion 131, and extension portion 131 is spaced apart from and overlapped with a connection line 132 of the data line 12 and the source electrode of the TFT 14. When executing a darkening process, the connection line 132 of the data line 12 and the source electrode of the TFT 14 are broken or disconnected, and connecting the extension portion 131 with the connection line 132 by a laser such that a voltage of the pixel electrode 15 and a voltage of the lower common electrode 13 are equal and further equal to a voltage of the upper common electrode. Accordingly, liquid crystal molecules corresponding to the pixel electrode 15 do not generate a tilting to conduct light in order to finish the darkening process. The present invention can operate easily, decrease the difficulty for the darkening process, avoid a fragmental bright point problem because of the darkening process, and improve product repair rate and yield rate.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A liquid crystal display device including a liquid crystal display, wherein the liquid crystal display comprises:
   an upper substrate, provided with an upper common electrode;
   a lower substrate, disposed oppositely to the upper substrate and provided with a lower common electrode having an extension portion, wherein, the lower substrate also provides with a scanning line, a data line, a color resist layer, a pixel electrode and a thin-film-transistor (TFT); a gate electrode of the TFT is connected with the scanning line; a source electrode of the TFT is connected with a data line; a drain electrode of the TFT is connected with the pixel electrode; the pixel electrode is disposed at one side of an isolation and intersection location of the data line and the scanning line; the extension portion is disposed at the other side of an isolation and intersection location of the data line and the scanning line; and
   a liquid crystal layer, disposed between the upper substrate and the lower substrate;
   wherein, the color resist layer is disposed above the scanning line, the data line and the TFT, and the pixel electrode is disposed above the color resist layer;
   wherein, the extension portion is extended from the lower common electrode to the source electrode of the TFT, and an end of the extension portion is adjacent to the source electrode of the TFT;
   wherein, a connection line of the data line and the source electrode of the TFT is spaced apart from and overlapped with the extension portion of the lower common electrode, and an isolation and intersection location of the extension portion and the connection line is spaced apart from the pixel electrode; when executing a darkening process, disconnecting the connection line from the data line and connecting the extension portion of the lower common electrode with the connection line by a laser such that the source electrode of the TFT and the lower common electrode are connected.

2. The liquid crystal display device according to claim 1, wherein, the extension portion is isolated, spaced apart from and overlapped with the connection line, and the extension portion is located below the connection line.

3. The liquid crystal display device according to claim 1, wherein, the lower substrate also provides with an insulation layer which makes the scanning line, the data line, the pixel electrode and the TFT to be insulated with each other.

4. The liquid crystal display device according to claim 3, wherein, the lower substrate is formed by a color filter on array (COA) technology or an organic flat layer technology.

5. The liquid crystal display device according to claim 3, wherein, the color resist layer or a flat layer is disposed between the pixel electrode and the insulation layer.

6. The liquid crystal display device according to claim 1, wherein, a storage capacitor is formed between the pixel electrode and the upper common electrode.

7. The liquid crystal display device according to claim 1, wherein, a liquid crystal capacitor is formed between the pixel electrode and the lower common electrode.

8. A liquid crystal display, comprising:
   an upper substrate, provided with an upper common electrode;
   a lower substrate, disposed oppositely to the upper substrate and provided with a lower common electrode having an extension portion, wherein, the lower substrate also provides with a scanning line, a data line, color resist layer, a pixel electrode and a thin-film-transistor (TFT); a gate electrode of the TFT is connected with the scanning line; a source electrode of the TFT is connected with a data line; a drain electrode of the TFT is connected with the pixel electrode; and
   a liquid crystal layer, disposed between the upper substrate and the lower substrate;
   wherein, the color resist layer is disposed above the scanning line, the data line and the TFT, and the pixel electrode is disposed above the color resist layer;
   wherein, the extension portion is extended from the lower common electrode to the source electrode of the TFT, and an end of the extension portion is adjacent to the source electrode of the TFT; and
   wherein, a connection line of the data line and the source electrode of the TFT is spaced apart from and overlapped with the extension portion of the lower common electrode, and an isolation and intersection location of the extension portion and the connection line is spaced apart from the pixel electrode; when executing a darkening process, disconnecting the connection line from the data line and connecting the extension portion of the lower common electrode with the connection line by a laser such that the source electrode of the TFT and the lower common electrode are connected.

9. The liquid crystal display according to claim 8, wherein, the extension portion is isolated, spaced apart from and overlapped with the connection line, and the extension portion is located below the connection line.

10. The liquid crystal display according to claim 8, wherein, the lower substrate also provides with an insulation layer which makes the scanning line, the data line, the pixel electrode and the TFT to be insulated with each other.

11. The liquid crystal display according to claim 10, wherein, the lower substrate is formed by a color filter on array (COA) technology or an organic flat layer technology.

12. The liquid crystal display device according to claim 10, wherein, the color resist layer or a flat layer is disposed between the pixel electrode and the insulation layer.

13. The liquid crystal display according to claim 8, wherein, a storage capacitor is formed between the pixel electrode and the upper common electrode.

14. The liquid crystal display according to claim 8, wherein, a liquid crystal capacitor is formed between the pixel electrode and the lower common electrode.

15. The liquid crystal display according to claim 8, wherein, the pixel electrode is disposed at one side of an isolation and intersection location of the data line and the scanning line; the extension portion is disposed at the other side of the isolation and intersection location of the data line and the scanning line.

16. A manufacturing method of a liquid crystal display, comprising:
   forming multiple parallel and spaced lower common electrodes on a lower substrate, wherein, each of the common electrodes has an extension portion;
   forming multiple parallel and spaced data lines on the lower substrate;
   forming multiple parallel and spaced scanning lines on the lower substrate, wherein, the scanning lines and the data lines are isolated and intersected to form multiple rectangles as a matrix; and
   forming a thin-film-transistor (TFT) at a corner of the rectangle, wherein, a gate electrode of the TFT is connected with the scanning line; a source electrode of the TFT is connected with a data line; a drain electrode of the TFT is connected with a pixel electrode; a connection line of the data line and the source electrode of the TFT is spaced apart from and overlapped with the extension portion of the lower common electrode;

forming the pixel electrode at one side of an isolation and intersection location of the data line and the scanning line; and utilizing a COA method to form a color resist layer above the scanning line, the data line and the TFT;

wherein, an isolation and intersection location of the extension portion and the connection line is spaced apart from the pixel electrode;

wherein, the pixel electrode is disposed above the color resist layer; and wherein, the extension portion is extended from the lower common electrode to the source electrode of the TFT, and an end of the extension portion is adjacent to the source electrode of the TFT.

17. The manufacturing method of a liquid crystal display according to claim 16, wherein, before the step of forming the pixel electrode at one side of an isolation and intersection location of the data line and the scanning line, further including a step of disposing an insulation layer on the lower substrate to make the scanning line, the data line, the pixel electrode and the TFT to be insulated with each other.

\* \* \* \* \*